Jan. 5, 1954 J. E. BECKER 2,664,706
ROTARY, TOROIDAL CHAMBER TYPE HYDRAULIC COUPLING
AND FLUID CIRCULATING CONTROLS THEREFOR
Filed Dec. 2, 1952
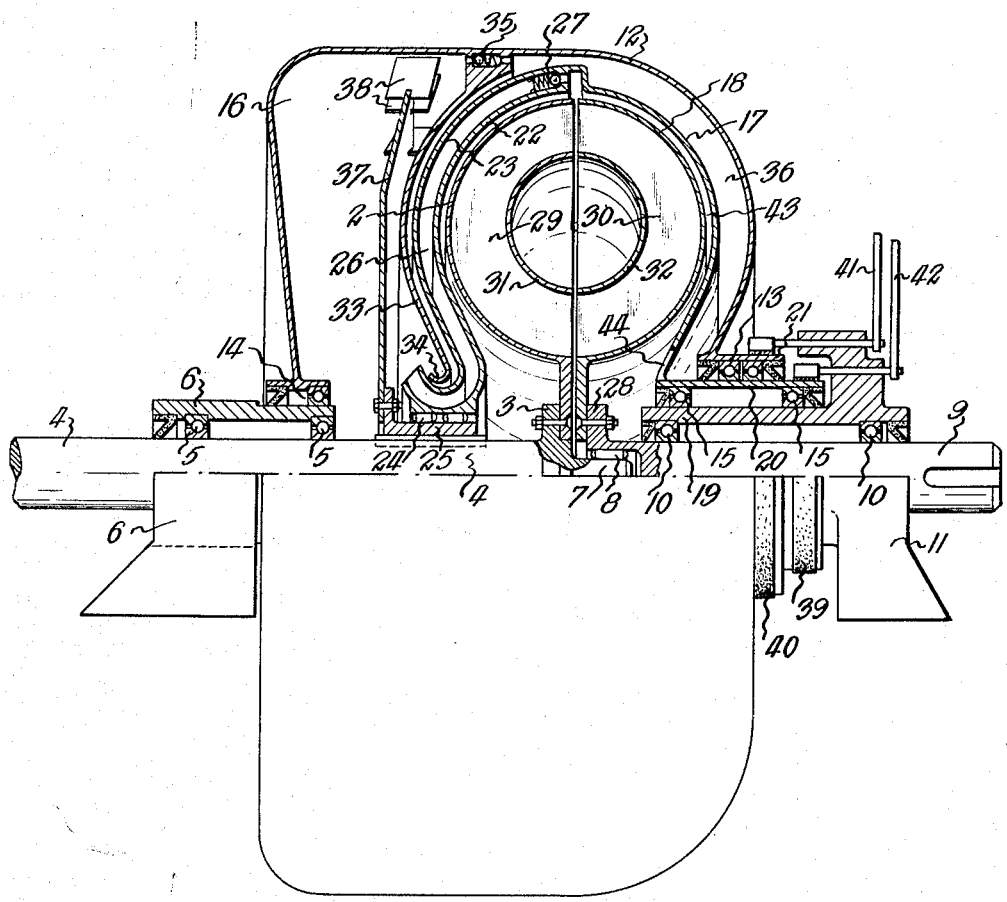
Inventor
JOHN E. BECKER
By
Attorney Patented Jan. 5, 1954

2,664,706

UNITED STATES PATENT OFFICE 2,664,706

ROTARY, TOROIDAL CHAMBER TYPE HYDRAULIC COUPLING AND FLUID CIRCULATING CONTROLS THEREFOR

John Edward Becker, Darlington Township, Durham County, Ontario, Canada

Application December 2, 1952, Serial No. 323,601

10 Claims. (Cl. 60—54)

1

My invention relates to fluid circulation controls for fluid couplings and is a continuation-in-part of my application, Serial No. 299,459, filed July 17, 1952, now Patent No. 2,644,304, in which application I disclosed a freely rotatable brake controlled coupling housing shell incorporating the fluid reservoir, the fluid being transferred from the reservoir to the coupling through the medium of an impeller wheel contained within the reservoir and connected to the coupling impeller assembly to rotate therewith; the ejection of fluid from the coupling being attained by the provision of a plurality of radial fins mounted upon the peripheral outer face of the portion of the impeller housing surrounding the coupling runner wheel to act as a centrifugal pump for directing fluid into the fluid reservoir, the pumping action of the fins being regulated by the speed of rotation of a freely rotatable brake controlled shell surrounding the impeller housing.

The present invention relates to a coupling having the same general arrangement of freely rotatable outer and inner shells and impeller wheel contained within the outer shell reservoir as shown in my said application, Serial No. 299,459, and the object of this invention is to eliminate the fins and the portion of the impeller housing surrounding the runner wheel, and through regulation of the speed of rotation of the shell surrounding the impeller and runner to utilize the pumping capacity obtained from the rotating blades of the impeller and runner to evacuate fluid from the coupling and transfer it to the reservoir.

With the foregoing and other objects in view as shall appear, my invention consists of a fluid circulation control for fluid couplings, constructed and arranged all as hereinafter more particularly described, and illustrated in the accompanying drawing in which:

The figure is a side elevational view of the coupling and reservoir assembly, the upper portion thereof being shown in section.

An impeller housing 2 of dished ring shape is secured to a flange 3 on the inner end of a driving shaft 4 which is carried by ball races 5 mounted within a supporting bracket 6. The inner end of the driving shaft has a reduced diameter portion 7 extending into a needle bearing 8 contained within the inner end of a driven shaft 9. The driven shaft is carried by ball race and seal ring assemblies 10 within the sleeve 19 of a supporting bracket 11 which is in alignment with the supporting bracket 6.

The entire coupling and reservoir assembly is contained within a rotatable cylindrical shell 12 carried upon a pair of ball bearing and seal ring assemblies 13 and 14; the assembly 13 surrounding inner ball bearing and seal ring assemblies 15, as shall be further explained, and the assembly 14 mounted upon the supporting hub bracket 6. One end of the shell 12 constitutes the fluid reservoir 16, and the other end of the shell envelopes and is spaced apart from an inner coupling shell 17 surrounding and spaced apart from the impeller housing 2 and runner housing 18.

The bearing and seal ring assemblies 15 surround and are supported by the inwardly extending sleeve 19 of the bracket 11, and the shell 17 is formed with an out-turned sleeve 20 which rides upon the assemblies 15. The bearing and seal ring assembly 13 is mounted between the out-turned sleeve 20 of the inner shell 17 and an out-turned sleeve 21 formed upon the outer shell 12.

The inner shell 17 follows the contour of the impeller and runner housing 2 and 18, and in its portion enclosing the impeller housing is formed with a pair of spaced apart walls 22 and 23 which are belled at their inner peripheries to form a fluid entry to the fluid reservoir 16. The curved inner periphery of the bell of the wall 22 is supported by a roller race assembly 24 carried upon a sleeve 25 secured upon the driving shaft 4. Fluid entry into the passage 26 between the walls 22 and 23 is controlled by several spaced apart ball check valves 27 arranged within the outer peripheral closures between the walls.

The concave ring shaped runner housing 18 has its central portion attached to a flange 28 on the inner end of the driven shaft 9. The impeller housing 2 and runner housing 18 carry a plurality of the usual radial impeller and runner blades 29 and 30 which support the usual ring members 31 and 32, whereby passages for fluid transmission of power are constituted.

The reservoir 16 is partitioned from the coupling by a dished ring wall 33 having its inner peripheral ring portion 34 curved to be concentric with the curved inner peripheral face of the bell of the wall 23. The partition wall contains a plurality of suitably spaced apart check valves 35 which provide one-way fluid passages from the reservoir to the space 36 between the shells 12 and 17. To inject fluid from the reservoir into the coupling, as shall be later described, an impeller disc wheel 37 carrying peripheral blades 38 is attached to the sleeve 25 secured upon the driving shaft 4, whereby the impeller wheel rotates in unison with the impeller housing 2 which is also attached to the driving shaft.

As the assembly unit formed by the outer shell 12, fluid reservoir 16 and inner shell 17 is freely mounted upon the bearing assemblies 13, 14, 15 and 25, the assembly unit will normally rotate under the action of the rotative movement of the fluid therein, the fluid in the assembly being free to centrifugally flow from between the impeller and runner housings to the interior of the shell 17, and as a certain quantity of fluid is generally present in either the reservoir 16 or the space 36 between the shells 12 and 17, the outer shell 12 will rotate with the shell 17.

To govern the rotative movement of the shells 12 and 17 any suitable braking mechanisms may be used, as for example, a pair of brake bands 39 and 40 surrounding the shell sleeves 20 and 21, and actuated under movement of brake handles 41 and 42. The fluid passage 36 between the shells 12 and 17 communicates with the fluid passage 43 between the shell 17 and the runner housing 18 through a plurality of orifices 44 contained within the central portion of the shell 17.

Operation

When the coupling is in driving operation, the shells 12 and 17 surrounding the impeller and runner are rotating therewith, as is also the reservoir 16 and impeller wheel 37, fluid being present in the shell 17 and in either the reservoir 16 or the space 36 between the shells 12 and 17.

To remove all or part of the fluid from the coupling, the brake 39 is applied to retard the speed of rotation of the shell 17. Immediately the speed of rotation of the shell 17 falls below the speed of rotation of the impeller and impeller driven runner, the rotative movement of the impeller and runner vanes 29 and 30 will create a hydrostatic pressure in the shell 17 with the resultant passage of fluid through the check valves 27 into the passage 26 between the shell walls 22 and 23 and from thence into the fluid reservoir 16. The speed of evacuation of the coupling, of course, depends upon whether the rotative speed of the shell 17 is merely reduced, or the shell brought to a stand-still.

As the shell 12 and reservoir 16 rotate at substantially the same speed as the speed of the coupling shell 17, due to fluid friction, there is little difference between the speed of rotation of the fluid reservoir 16 and the contained impeller wheel 37 which rotates in unison with the drive shaft and the coupling impeller; consequently the reservoir 16, its contained centrifugal fluid ring and the blades 38 of the impeller wheel, normally have substantially the same rotative speed.

To pump fluid from the reservoir to the coupling, the brake 40 governing the rotation of the shell 12 is applied to retard or stop rotation of the reservoir, while at the same time the impeller wheel 37, which is attached to the driving shaft 4, maintains its speed. This action creates a hydrostatic pressure in the fluid ring in the reservoir with the resultant passage of fluid from the reservoir through the check valves 35 into the fluid passage 36 and from thence through the orifices 44 into the passage 43 between the shell 17 and the runner housing 18 to be centrifugally carried to the peripheral portions of the impeller and runner housings from where it passes between the blades 29 and 30 into the housings.

From the foregoing description it will be apparent that the coupling will have the same operating flexibility as that of the couping disclosed in my said application Serial No. 299,459, and that while I have shown a particular construction of this invention, variations may be made without departing from the underlying principles as set forth in the appended claims.

What I claim as my invention is:

1. In combination with a fluid coupling assembly comprising an impeller secured to a driving shaft and a runner positioned adjacently to the impeller and secured to a driven shaft, an outer fluid frictionally driven freely rotatable shell within which the coupling assembly is contained, a fluid reservoir coupled to the shell and rotatable therewith, an impeller wheel rotatable with the driving shaft and contained within the reservoir to constitute a fluid pump, a pumped fluid passage extending from the reservoir to the impeller and runner, and brake means for controlling the rotative speed of the outer shell, of a fluid frictionally driven freely rotatable inner coupling shell contained within the outer shell to surround the impeller and runner, a check valve controlled passage forming a fluid communication between the inner coupling shell and the reservoir, and brake means for controlling the rotative speed of the inner shell.

2. A combination as defined in claim 1, wherein the outer shell is spaced apart from the inner coupling shell, part of the fluid passage from the reservoir to the impeller and runner being formed by the space between the shells.

3. A combination as defined in claim 1, wherein the fluid passage from the reservoir to the impeller and runner is check valve controlled, the outer shell being spaced apart from the inner coupling shell, a portion of said fluid passage being formed by the space between the shells.

4. A combination as defined in claim 1, wherein the outer shell is spaced apart from the inner coupling shell and the inner coupling shell spaced apart from the impeller and runner, the fluid passage from the reservoir to the impeller and runner being formed by the space between the outer shell and the inner coupling shell and the space between the coupling shell and the runner.

5. A combination as defined in claim 1, wherein the outer shell is spaced apart from the inner coupling shell and the inner coupling shell spaced apart from the impeller and runner, the fluid passage from the reservoir to the impeller and runner being formed by the space between the outer shell and the inner coupling shell and the space between the coupling shell and the runner, and fluid flow control check valves positioned at the entrance to the fluid passage space between the outer shell and the inner coupling shell.

6. A combination as defined in claim 1, wherein a pair of spaced apart disc-shaped walls extend from the periphery of one end of the inner coupling shell to the vicinity of its axis, the space between the walls opening into the peripheral portion of the inner coupling shell and into the reservoir whereby the fluid passage between the inner coupling shell and the reservoir is formed.

7. A combination as defined in claim 1, wherein a pair of spaced apart disc-shaped walls extend from the periphery of one end of the inner coupling shell to the vicinity of its axis, the space between the walls opening into the peripheral portion of the inner coupling shell and into the reservoir whereby the fluid passage between the inner coupling shell and the reservoir is formed, said walls being contained within the portion of the inner coupling shell surrounding the impeller.

8. A combination as defined in claim 1, wherein the outer shell is spaced apart from the inner coupling shell, part of the fluid passage from the reservoir to the impeller and runner being formed by the space between the shells, a pair of spaced apart disc-shaped walls extending from the periphery of one end of the inner coupling shell to the vicinity of its axis, the space between the walls opening into the peripheral portion of the inner coupling shell and into the reservoir whereby the fluid passage between the inner coupling shell and the reservoir is formed.

9. A combination as defined in claim 1, wherein the outer shell is spaced apart from the inner coupling shell and the inner coupling shell spaced apart from the impeller and runner, the fluid passage from the reservoir to the impeller and runner being formed by the space between the outer shell and the inner coupling shell and the space between the inner coupling shell and the runner, a pair of spaced apart disc-shaped walls extending from the periphery of one end of the inner coupling shell to the vicinity of its axis, the space between the walls opening into the peripheral portion of the inner coupling shell and into the reservoir whereby the fluid passage between the inner coupling shell and the reservoir is formed.

10. A combination as defined in claim 1, wherein the outer shell is spaced apart from the inner coupling shell and the inner coupling shell spaced apart from the impeller and runner, the fluid passage from the reservoir to the impeller and runner being formed by the space between the outer shell and the inner coupling shell and the space between the inner coupling shell and the runner, fluid flow control check valves positioned at the entrance to the fluid passage space between the outer shell and the inner coupling shell, a pair of spaced apart disc-shaped walls extending from the periphery of one end of the inner coupling shell to the vicinity of its axis, the space between the walls opening into the peripheral portion of the inner coupling shell and into the reservoir whereby the fluid passage between the inner coupling shell and the reservoir is formed.

JOHN EDWARD BECKER.

References Cited in the file of this patent

UNITED STATES PATENTS

| Number | Name | Date |
|---|---|---|
| 1,910,696 | Kiep | May 23, 1933 |
| 2,550,664 | Becker | May 1, 1951 |